March 22, 1960

W. J. DAVIS

WIRE STRIPPER 2,929,083

Filed June 17, 1958

INVENTOR
WILLARD J. DAVIS
BY George Baron
ATTORNEY

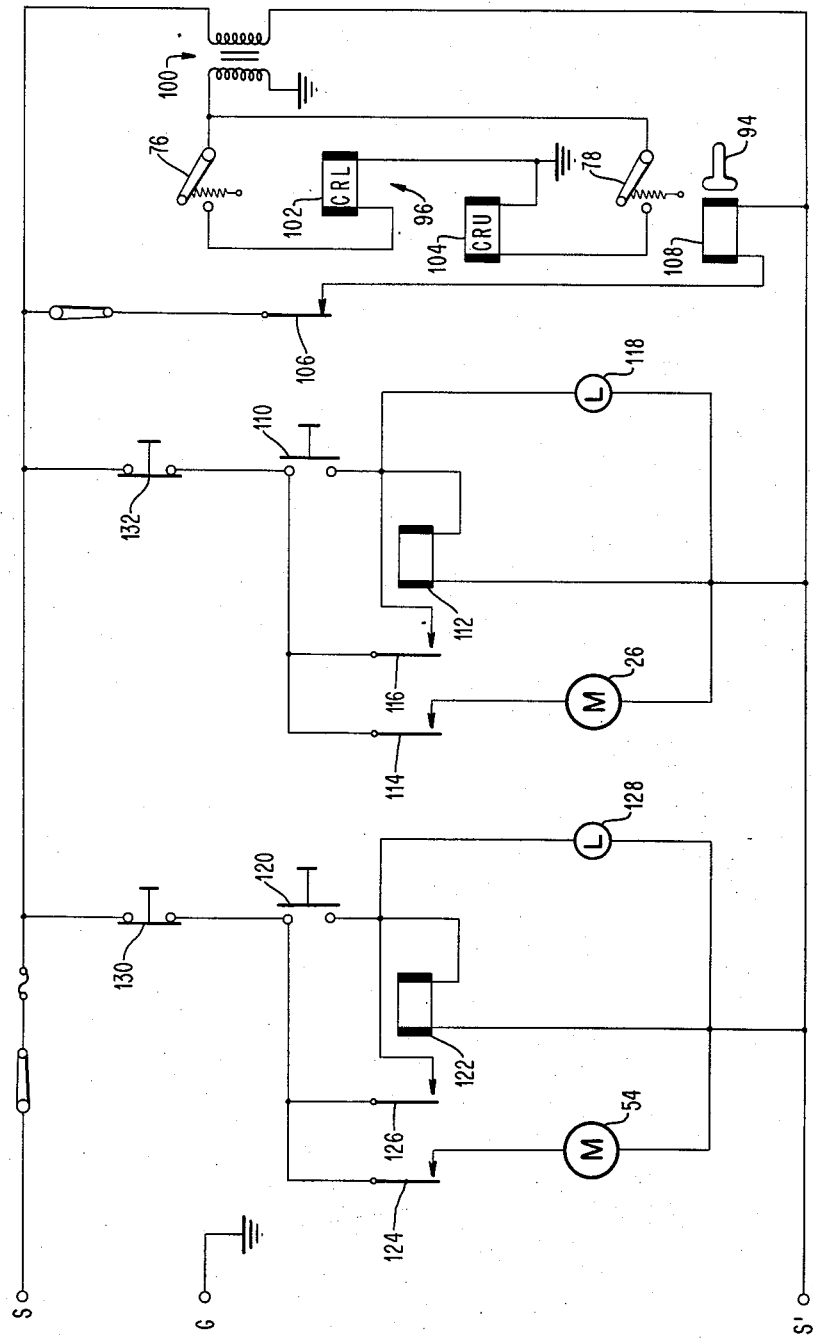

2,929,083
WIRE STRIPPER

Willard J. Davis, Mount Marion, N.Y., assignor to International Business Machines Corporation, New York, N.Y., a corporation of New York Application June 17, 1958, Serial No. 742,532

4 Claims. (Cl. 15—4)

This invention relates to wire stripping machines, and more particularly to a wire stripping machine that is particularly adapted to scrape off an insulating coating from electrical conductors having relatively small cross-sections.

Toroidal magnetic cores of the type disclosed in the Stern-Montagny Patent No. 2,812,136, which issued November 5, 1957, are wound with many turns of 36–42 gauge wire, the latter having a thin coating of insulation thereon. In the winding of such cores with thin insulated wire, it is desirable to remove fixed increments of insulation periodically from such wire. The insulation is removed because after each core is wound, a portion of the winding must be exposed and soldered to an electrical terminal or other electrical conductor. The stripped wire may also be employed in threading ferrite cores of multiplane assemblies.

The wire to be stripped is taken from one spool, stripped of its insulation at predetermined intervals, and wound onto another spool, the latter spool then being available for the winding of magnetic cores and ferrite core plane assemblies. The major components of the wire-stripping machine are a rotating support for the spool of wire to be stripped, a solenoid-actuated pair of stripping rollers for removing the varnish coating, a pair of rollers for cleaning the varnish from the immediate environment of that portion of the wire being stripped, an assembly to sense and control the stripping operation, and a spool upon which the stripped wire is wound.

The sensing assembly comprises a pair of microswitches located on the periphery of a circular path, such microswitches being actuable by a cam so that the contact of the first microswitch with the cam will bring the stripping rollers together to begin the stripping action, and the contact of the second microswitch with the cam will terminate the stripping action. Moreover, by allowing for variations in the distance between microswitches, the incremental lengths of stripped wire can be varied. The wire to be stripped is carried by a guide post which is located in front of the stripping rollers and such guide post is made to oscillate across the surface of the stripping rollers during the stripping action. Such oscillations add to the life of the stripping rollers in that they permit stripping to take place along the entire surface of such rollers rather than along a restricted area of the rollers. The stripping action resulting from the instant machine is rapid, automatic, and results in a uniform spacing of the non-insulated portions of a spool of wire.

Consequently it is an object of this invention to provide an automatic wire-stripping device.

It is yet another object to provide a simple but rugged and reliable machine for rapidly removing very thin layers of insulation from a spool of wire.

A further object is to provide a wire-stripping machine that permits the stripping action to take place while the wire is being wound about a spool.

Other objects of the invention will be pointed out in the following description and claims and illustrated in the accompanying drawings which disclose, by way of example, the principles of the invention and the best modes which have been contemplated of applying those principles.

Fig. 3 represents diagrammatically the electrical circuitry for actuating the stripping apparatus.

Figures 1, 2:
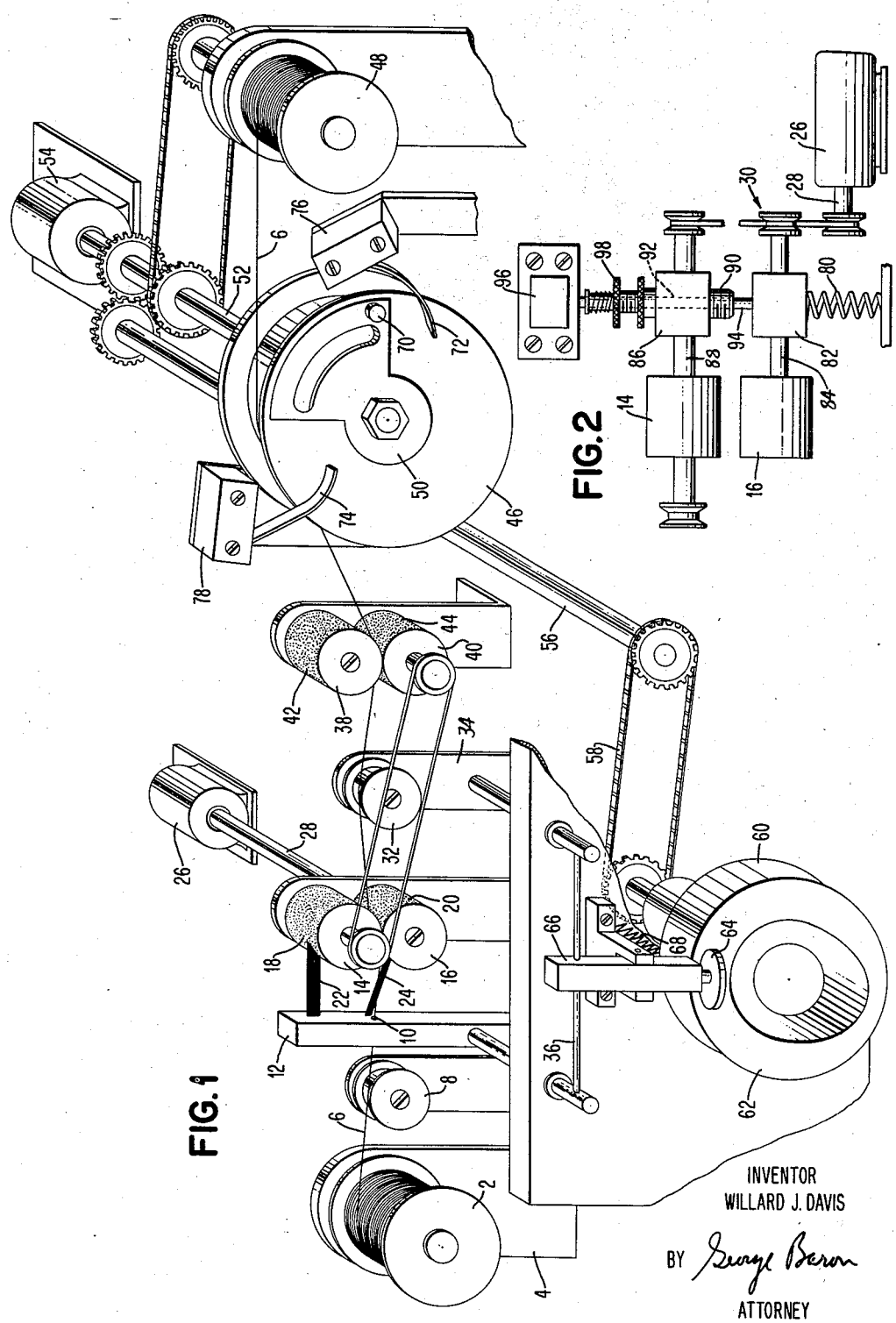
Fig. 1 illustrates an embodiment of the invention.
Fig. 2 illustrates the manner in which the stripping rollers are actuated by a solenoid not illustrated in Fig. 1.

Referring to Fig. 1 there is shown a spool 2 mounted on a suitable support 4, such spool 2 containing the insulated wire 6 which is supported on a nylon guide 8 as such a wire is payed out. The insulated wire 6 is fed through a narrow hole 10 in an upright bar 12, the latter being capable of oscillating parallelly to the longitudinal axes of stripping rollers 14 and 16, the latter containing fibre glass 18 and 20, or the like, on their respective outer surfaces. 22 and 24 are stiff wire brushes each of which is fixed at one end to upright bar 12 and oscillate with the latter while each of the other ends moves along its respective surface 18 or 20, such movement of brushes 22 and 24 serving to clean the fibre glass surfaces 18 and 20 during the stripping operation.

Motor 26 drives the stripping cylinders 14 and 16 through shaft 28 and belt drive 30, better seen in Fig. 2. Wire 6 is supported on a second nylon guide roll 32, such guide roll being supported on arm 34, both upright bar 12 and arm 34 being connected together by U-shaped yoke 36 so that the former two elements may move in unison. Wire 6 continues to move to the right through a pair of rollers 38 and 40, the latter having suitable fibre on their outer cylindrical surfaces 42 and 44 for removing the insulating varnish that clings to wire 6 after rollers 14 and 16 have performed their stripping operation. Wire 6 passes over another guide roll 46 and is wound on a spool 48, such spool 48 now containing the wire in a condition more suitable for the winding of toroidal cores and the like.

Guide roll 46 also carries cam 50, the latter being rotated by shaft 52 that is driven by motor 54. By employing a suitable gear and sprocket assembly, motor 54 serves not only to rotate guide roll 46 and cam 50 but also to rotate take-up spool 48 as well as shaft 56. Rotation of shaft 56 causes chain connection 58 to rotate cylindrical member 60 which has an eccentric surface 62 at its outer end. A wheel 64 that rides on eccentric surface 62 is conventionally affixed to upright arm 66, the latter being joined to U-shaped yoke 36. Roller 64 is urged, through upright arm 66, by spring 68 against eccentric surface 62.

Protruding from cam 50 is a lug or finger 70, such lug 70 being adapted to hit lever arms 72 and 74, respectively, as it traverses its circular path. Lever arm 72 is associated with microswitch 76 and lever arm 74 with microswitch 78. The manner in which microswitches 76 and 78 are effective in controlling the stripping operation is better seen in Fig. 2, wherein stripping cylinders 14 and 16 are shown as being driven by motor 26 through drive pulley 30. Cylinder 16 is functionally operable with cylinder 14 when spring 80 urges the bearing support 82 of cylinder's 16 shaft 84 upwardly toward cylinder 14. In the bearing housing 86 for shaft 88 that drives the stripping cylinder 14, or immediately adjacent thereto, is located a threaded pin 90, such pin 90 having a bore 92 for accommodating a rod 94. Rod 94 is actuated by an armature of a relay shown generally as 96. Microswitches 76 and 78 are electrically connected to such armature so that when microswitch 76 is closed, relay 96 is actuated to permit rod 94 to move upwardly in bore 92 and permit contact between cylinders 14 and 16 so as to start the stripping action. The stripping action continues until lug 70 hits lever arm 74, such contact closing microswitch 78. The closing of the latter switch actuates relay 96 so that rod 94 is urged downwardly with sufficient force to oppose the upward force of spring 80 so as to separate cylinders 14 and 16. As a consequence, cylinder 16 is separated from cylinder 14 and stripping action is discontinued until lug 70 makes contact with lever arm 72 again.

In order to vary the increment of wire being stripped, the positions of microswitches 76 and 78 may be altered by moving them closer together or further apart. If desired, different cams may be substituted for cam 50 so that switches 76 and 78 are actuated for different rotation times of such substituted cams. A knurled knob 98 is integral with locating pin 90 and, by turning such knob 98, one may vary the distance between pin 90 and gear box 82. Such variations in pin 90 position permit the operator to make minute variations in the pressure with which rollers 14 and 16 bear against each other.

The operation of the wire stripper will now be described. Wire 6 to be stripped is unwound from spool 2, placed on guide roll 8, threaded through hole 10 and between rollers 14 and 16 and placed over a second guide roll 32, from where it is passed between cleaning rollers 38 and 40, over cam-carrying roller 46 and onto take-up spool 48. The operator also adjusts the spacing of microswitches 76 and 78 or selects a particular cam 50 and then turns on motors 26 and 54. The stripping action is automatic, whereby predetermined increments of varnish or similar insulating coating are removed. At the same time that the automatic stripping action is begun, rotation of cylinder 60 causes yoke 36 to oscillate so that wire 6 moves longitudinally along the surfaces of stripping rollers. Brushes 22 and 24 also oscillate so as to move longitudinally across the outer surfaces 18 and 20 and clean the latter of scrapped varnish or insulation. Fibre-covered cylinders 38 and 40 remove whatever debris still remains on the wire 6 when the latter reaches the station where such cylinders 38 and 40 are located.

Fig. 3 is the electrical schematic of a circuit which correlates the action of stripping rollers 14 and 16 with the actuation of microswitches 76 and 78. Starting at the left of Fig. 3, there is shown the input terminals S and S' and grounded terminal G to which is applied an alternating current source, e.g., of 115 volts. A step down transformer 100 applies about 12 volts to relay 96 which is a latch relay sold as Doslex-19 and manufactured by the Ohmite Manufacturing Company in Illinois. Contact switch 106 is closed or broken in accordance with which solenoid 102 or 104 is actuated, whereas, a solenoid 108 that actuates pin 94 is made responsive to the conditions of contact switch 106. When lug 70 momentarily closes microswitch 76 against its spring-biased open position, solenoid 102 labeled CRL mechanically latches to disengage contact switch 106. When lug 70 momentarily closes microswitch 78 against its spring-biased open position, solenoid 104 labeled CRU mechanically unlatches so that contact switch 106 is in its closed position. Motor 26 that rotates the stripping rollers 14 and 16 is started by pressing start button 110 which closes the circuit to a solenoid 112, the actuation of the latter causing contact switches 114 and 116 to close and start motor 26 and light an indicating lamp 118. When start button 110 is released, conventional spring-actuated means (not shown) withdraws stop button 110 from its associated contacts, and an obvious holding circuit is applied to motor 26 and indicating lamp 118. In a similar manner, contact button 120 is depressed against its spring-actuated means (not shown) to actuate a solenoid 122 so as to close contact switches 124 and 126 whereby motor 54 is operating and indicating lamp 128 is lit even after start button 120 is released. Buttons 130 and 132 are stop buttons that are depressed for stopping their corresponding motors 54 and 26. It is understood that buttons 110 and 120 can be linked by a common arm so that they can be operated simultaneously to start both motors 26 and 54. Likewise stop buttons 130 and 132 may also be linked by a common arm so that, if desired, both motors 26 and 54 can be simultaneously stopped.

When buttons 110 and 120 are depressed, motors 26 and 54 are energized causing the rotation of stripping rollers 14 and 16, rotation of cam 50, cylindrical member 60, take up roller 48, etc. When lug 70 hits lever arm 72, the relay 96 is in its latched condition and contact switch 106 is opened, disabling solenoid 108 so as to cause rod 94 to lose its counter effect against spring 80, and stripping rollers 14 and 16 become engaged. When lug 70 hits lever arm 74, microswitch 78 is momentarily closed and relay 96 is set to its unlatched condition, closing contact switch 106. The closure of switch 106 energizes solenoid 108 so that rod 94 is urged against the effect of spring 80, causing stripping rollers 14 and 16 to become disengaged. The cycle is repeated until stop button 130 is depressed to shut off the source of current to motor 54.

Although the instant machine can be employed to strip the insulation from electrical conductors of various sizes, it is particularly useful in removing very thin layers of insulation from small diameter conductors without breaking or stretching such conductors. Moreover such delicate stripping takes place rapidly and automatically.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a device for repetitively removing predetermined increments of an insulated covering from an electrical conductor comprising means for playing out such electrical conductor between a pair of spaced apart engageable stripping rollers, a station having a pair of switches located thereat, said switches controlling the engagement and disengagement of said stripping rollers, means for rotating said station so that said switches are alternately actuated whereby engagement and disengagement of said stripping rollers takes place in accordance with which switch is actuated, cleaning means for said stripping rollers, and means for simultaneously oscillating said cleaning means and said played out wire longitudinally along the stripping surfaces of said rollers.

2. A device for repetitively removing predetermined increments of an insulated covering from an electrical conductor comprising means for playing out such electrical conductor between a pair of spaced apart engageable stripping rollers, a station having a pair of switches located thereat, said switches controlling the engagement of said stripping rollers, means for rotating said station so that said switches are alternately actuated whereby said engagement and disengagement of said stripping rollers takes place in accordance with which switch is actuated, cleaning means for said stripping rollers, means for simultaneously oscillating said cleaning means and said played out wire longitudinally along the stripping surfaces of said rollers, and further means for cleaning said wire after it has been stripped.

3. In a device as defined in claim 2 including a take-up spool for winding the stripped wire.

4. In a device as defined in claim 1 wherein said simultaneous oscillating means are operative only when said station is actuated by its associated rotating means.

References Cited in the file of this patent

UNITED STATES PATENTS

| | | |
|---|---|---|
| 2,178,442 | Torbet | Oct. 31, 1939 |
| 2,307,046 | Johnson | Jan. 5, 1943 |
| 2,806,333 | Head | Sept. 17, 1957 |